(12) United States Patent
Terlizzi

(10) Patent No.: US 8,254,828 B2
(45) Date of Patent: Aug. 28, 2012

(54) METHODS AND SYSTEMS FOR MIXING MEDIA WITH COMMUNICATIONS

(75) Inventor: Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1099 days.

(21) Appl. No.: 11/998,648

(22) Filed: Nov. 30, 2007

(65) Prior Publication Data
US 2009/0143007 A1   Jun. 4, 2009

(51) Int. Cl.
*H04H 40/00* (2008.01)
(52) U.S. Cl. ............... 455/3.06; 455/414.1; 455/463; 455/502; 455/517; 370/352; 379/88.13
(58) Field of Classification Search ........... 455/3.06, 455/412.1, 414.1, 463, 39, 41.2, 502, 503, 455/517, 518; 370/352, 503; 379/88.13; 369/47.1; 709/217, 204
See application file for complete search history.

(56) References Cited

U.S. PATENT DOCUMENTS

| | | | |
|---|---|---|---|
| 6,323,846 B1 | 11/2001 | Westerman et al. | |
| 6,798,872 B1 * | 9/2004 | Matsumoto et al. | 379/142.01 |
| 7,876,789 B2 * | 1/2011 | Synnergren et al. | 370/503 |
| 2004/0224638 A1 * | 11/2004 | Fadell et al. | 455/66.1 |
| 2007/0152983 A1 | 7/2007 | McKillop et al. | |
| 2007/0165599 A1 * | 7/2007 | Skog et al. | 370/352 |
| 2008/0164934 A1 | 7/2008 | Hankey et al. | |
| 2008/0166003 A1 | 7/2008 | Hankey et al. | |
| 2009/0111378 A1 * | 4/2009 | Sheynman et al. | 455/41.1 |

OTHER PUBLICATIONS

U.S. Appl. No. 11/824,031, filed Jun. 28, 2007, Hankey et al.
U.S. Appl. No. 11/824,203, filed Jun. 28, 2007, Hankey et al.

* cited by examiner

*Primary Examiner* — Shaima Q Aminzay
(74) *Attorney, Agent, or Firm* — Kramer Levin Naftalis & Frankel LLP

(57) ABSTRACT

A communications device may transmit a media item chosen by a user over a communication path also being used to transmit an established communications operation. The user may select a media item of any known type, including for example a musical selection, a video, a voicemail, a podcast, an image, or any other suitable media item. The user may select any suitable contact method for the communications operation, including for example, telephone, voicemail, email, text message, chatting, fax, or any other suitable method.

40 Claims, 9 Drawing Sheets

METHODS AND SYSTEMS FOR MIXING MEDIA WITH COMMUNICATIONS

BACKGROUND OF THE INVENTION

While all media are becoming increasingly portable for an individual, they are still not as easily shared with others located remotely from the individual. For example, an individual may call his friend to discuss music, but in order for the friend to listen to the music, the individual either may have to send the music to the friend using a device other than his telephone, or he may have to end the phone call and use the telephone to send the friend an email with the music attached.

Using some existing communications devices, users may initiate a communications operation with a recipient, but the user may not use the same communications device to share media with the recipient while the communications operation is in progress. For example, an individual may download music to a device and may listen to the music anywhere that he can take the device. Alternatively, an individual may create or store a video or other visual media on a device, and may playback the visual media for himself or for others in the presence of his device. The user, and other individuals in the physical presence of the user, may listen to or observe media on the communications device. But the user may not use his communications device to communicate with a remote recipient through a communications operation while transmitting media to the recipient over the same communications path.

SUMMARY OF THE INVENTION

Methods and systems are provided for combining media with a communications operation and transmitting both over the same communication path via the active audio output of a communications device.

The present invention permits a user to initiate a communications operation with a recipient, or to receive a communications operation initiated by another individual, and to transmit a selected media item over the same communication path used for the communications operation without terminating the communications operation. This combined transmission can occur regardless of the type of media selected by the user to be added to the communications operation. The communications device may be any device suitable for transmitting a communication (e.g., voice or data) as part of a communications operation. The communications operation may comprise audio communications (e.g., telephone or video conversations), data communications (e.g., e-mail, instant messaging, text messaging), video communications (e.g., video conferencing) or any combination thereof. The communication may be sent via any suitable means for transmitting voice or data (e.g., via a wired telephone line or via cable line, or via a wireless network). The type of media transmitted may include any known media, such as music, videos, voicemail, podcasts, images, or any other suitable media example.

The communications device may combine a media item with a communications operation in any suitable manner. In one embodiment, the communications device may establish a communications operation and may send a media item selected by the user to the active audio output so as to transmit to the recipient both the communications operation and the media item over the same communication path. For example, the user may initiate a telephone call with his friend in order to ask the friend if she is familiar with a particular song. Once the phone call has been established between the user and his friend, the user may select the song of interest from his communications device, and he may send the song to his friend over the same communication path used by the communications device to establish the communications operation, so that the two may continue their phone conversation while the song plays simultaneously. In another embodiment, the communications device may receive a communications operation in the form of a request for a video conference, and once the conference is established, the user may select a video (e.g., a YouTube™ selection) to be sent back to the conference initiator by the communications device over the same communication path.

As a further embodiment, the user may play a media item (e.g., a song) on his communications device, and the user may remember to call his friend while the song is playing. The user may pause the media item and may instruct the communications device to initiate a communications operation with his friend. If the friend responds and the friend's communication device receives the communications operation, thereby establishing a communications path, the user may re-start the media item and may instruct the communications device to combine the media item with the communications operation in order to share the media item with his friend.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
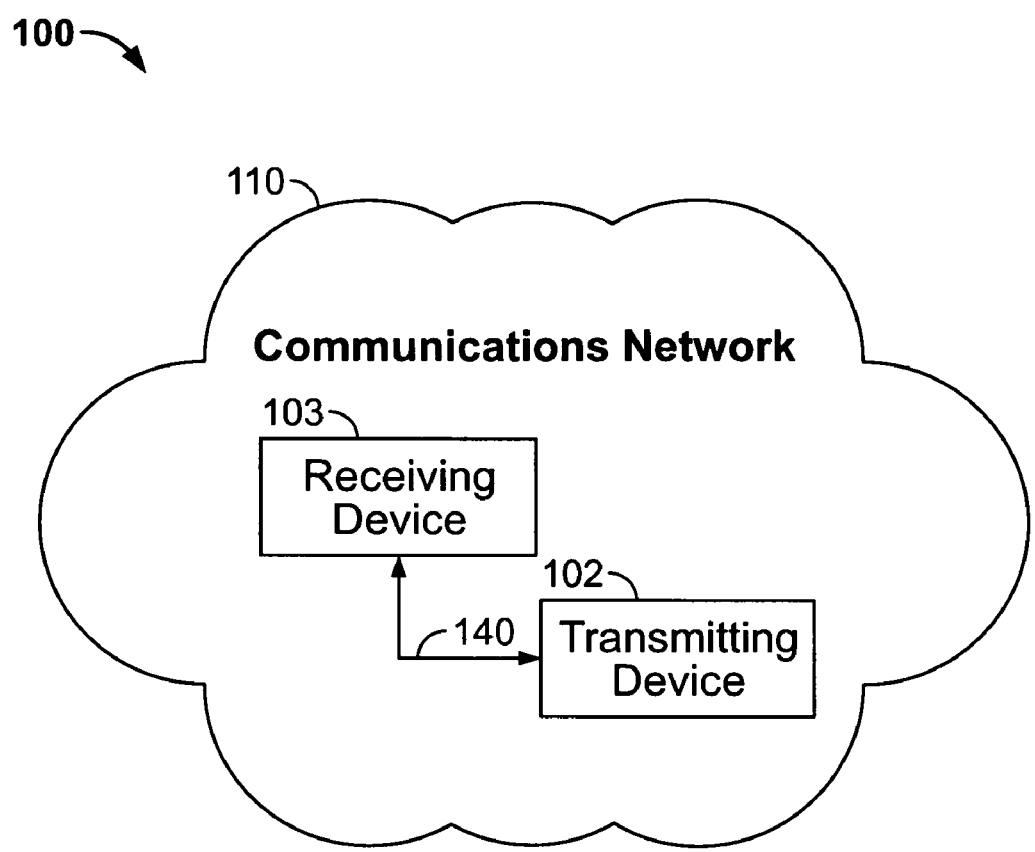
FIG. 1 is a schematic view of a communications system in accordance with one embodiment of the invention.

FIG. 1 is a schematic view of a communications system in accordance with one embodiment of the invention. Communications system 100 may include a communications device that initiates an outgoing communications operation (transmitting device 102) and communications network 110, which transmitting device 102 may use to initiate and conduct communications operations with other communications devices within communications network 110. For example, communications system 100 may include a communication device that receives the communications operation from the transmitting device (receiving device 103). Although communications system 100 may include several transmitting devices 102 and receiving devices 103, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth (registered trademark), high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. Transmitting device 102 and receiving device 103, when located within communications network 110, may communicate over a bidirectional communication path such as path 140. Both transmitting device 102 and receiving device 103 may be capable of initiating a communications operation and receiving an initiated communications operation.

Transmitting device 102 and receiving device 103 may include any suitable device for sending and receiving communications operations. For example, transmitting device 102 and receiving device 103 may include a media player such as an iPod available from Apple Inc., of Cupertino, Calif., a cellular telephone or a landline telephone, a personal e-mail or messaging device with audio and/or video capabilities (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 2:
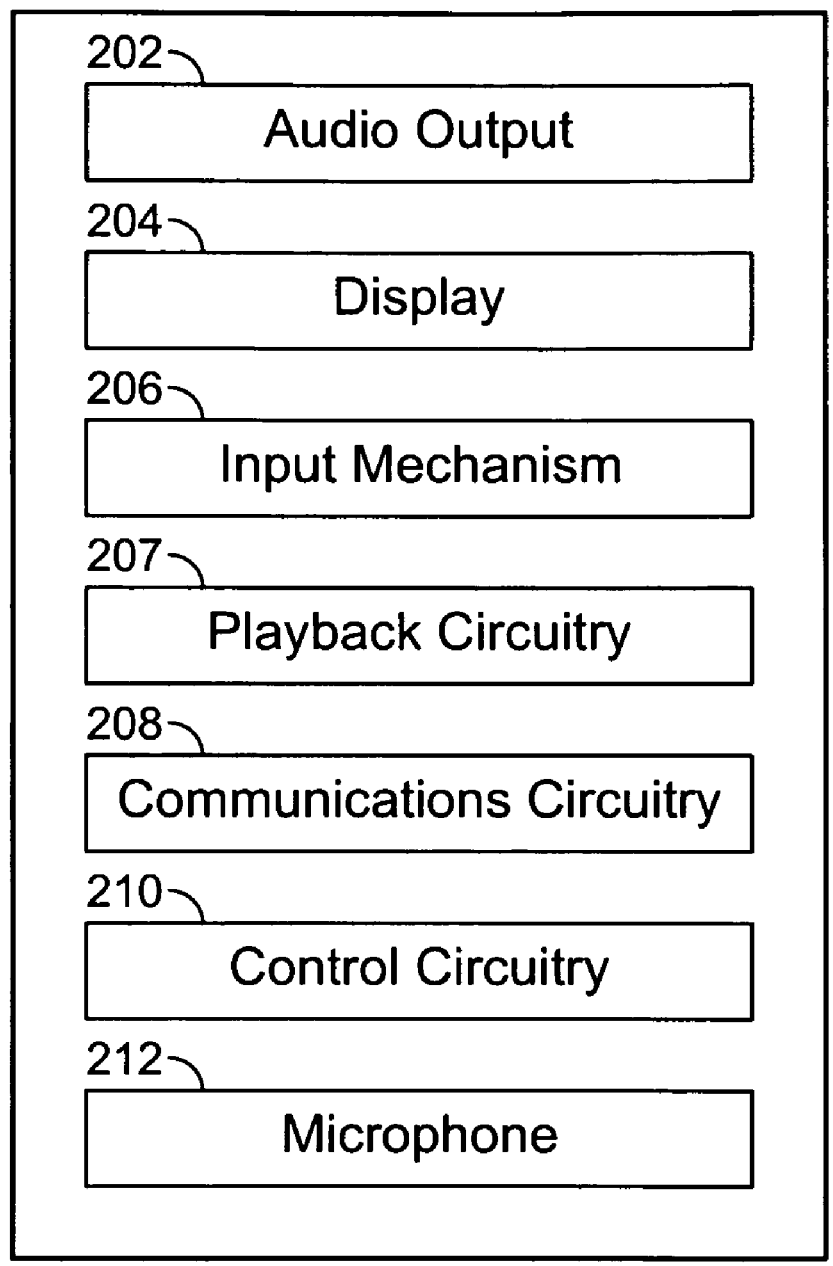
FIG. 2 is a schematic view of a communications device in accordance with one embodiment of the invention.

FIG. 2 is a schematic view of a communications device in accordance with one embodiment of the invention. Both transmitting device 102 and receiving device 103 may include some or all of the features of communications device 200. Communications device 200 may include audio output 202, display 204, input mechanism 206, playback circuitry 207, communications circuitry 208, control circuitry 210, microphone 212, and any other suitable components. All of the applications employed by audio output 202, display 204, input mechanism 206, playback circuitry 207, communications circuitry 208 and microphone 212 may be interconnected and managed by control circuitry 210. A hand held music player capable of transmitting music to other tuning devices may be found in U.S. Patent Application No. 20040224638, published Nov. 11, 2004, entitled "Media Player System," which is incorporated by reference herein in its entirety.

Audio output 202 may include any suitable audio component for providing audio to the user of communications device 200. For example, audio output 202 may include one or more speakers (e.g., mono or stereo speakers) built into communications device 200. In some embodiments, audio output 202 may include an audio component that is remotely coupled to communications device 200. For example, audio output 202 may include a headset, headphones or earbuds that may be coupled to communications device with a wire (e.g., coupled to communications device 200 with a jack) or wirelessly (e.g., Bluetooth® headphones or a Bluetooth® headset).

Display 204 may include any suitable screen or projection system for providing a display visible to the user. For example, display 204 may include a screen (e.g., an LCD screen) that is incorporated in communications device 200. As another example, display 204 may include a movable display or a projecting system for providing a display of content on a surface remote from communications device 200 (e.g., a video projector). Display 204 may be operative to display content (e.g., information regarding communications operations or information regarding available media selections) under the direction of control circuitry 210.

Input mechanism 206 may be any suitable mechanism for providing user inputs or instructions to communications device 200. Input mechanism 206 may take a variety of forms, such as a button, keypad, dial, a click wheel, or a touch screen. The user interface may include a multi-touch screen such as that described in U.S. Pat. No. 6,323,846, which is incorporated by reference herein in its entirety. The user interface may emulate a rotary phone or a multi-button keypad, which may be implemented on a touch screen or the combination of a click wheel or other user input device and a screen. A more detailed discussion of such a rotary phone interface may be found, for example, in U.S. patent application publication No. 2007/0152983, published on Jul. 5, 2007, entitled "Touch Pad with Symbols based on Mode," which is incorporated by reference herein in its entirety.

Playback circuitry 207 may be any suitable circuitry operative to read, classify, store, play and transmit different types of media to an active output such as audio output 202 (e.g., audio) or display 204 (e.g., video) at the direction of control circuitry 210. Playback circuitry 207 may be operative to interface with control circuitry 210 to combine any suitable media item with an established communications operation for transmission over a communication path using communications circuitry 208.

Communications circuitry 208 may be any suitable communications circuitry operative to connect to a communications network (e.g., communications network 110, FIG. 1) and to transmit communications operations and media from communications device 200 to other devices within the communications network. Communications circuitry 208 may be operative to interface with the communications network using any suitable communications protocol such as, for example, Wi-Fi (e.g., a 802.11 protocol), Bluetooth (registered trademark), high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 208 may be operative to create a communications network using any suitable communications protocol. For example, communications circuitry 208 may create a short-range communications network using a short-range communications protocol to connect to other communications devices. For example, communications circuitry 208 may be operative to create a local communications network using the Bluetooth® protocol to couple communications device 208 with a Bluetooth® headset.

Control circuitry 210 may be operative to control the operations and performance of communications device 200. Control circuitry 210 may include, for example, a processor, a bus (e.g., for sending instructions to the other components of communications device 200), memory, storage, or any other suitable component for controlling the operations of communications device 200. In some embodiments, a processor may drive the display and process inputs received from the user interface. The memory and storage may include, for example, cache, Flash, ROM, and/or RAM. In some embodiments, memory may be specifically dedicated to storing firmware (e.g., for device applications such as an operating system, user interface functions, and processor functions). In some embodiments, memory may be operative to store information related to other devices with which the communications device performs communications operations (e.g., saving contact information related to communications operations or storing information related to different media types and media items selected by the user).

Control circuitry 210 may be operative to perform the operations of one or more applications implemented on communications device 200. Any suitable number or type of applications may be implemented. Although the following discussion will enumerate different applications, it will be understood that some or all of the applications may be combined into one or more applications. For example, communications device 200 may include a media application (e.g., QuickTime, MobileMusic.app, or MobileVideo.app). The media application may be configured to store the user's media files within communications device 200, and to display the media files for selection and manipulation by the user. The media application may use any suitable approach for storing, categorizing, and displaying the media files. For example, the media application may store media files randomly, while allowing the media files to be sorted for display in any suitable manner, for example based upon the attributes within the metadata of each media file. A user may use the media application to sort music files alphabetically by artist or by song title or by album title, chronologically by date stored to communications device 200, or thematically by music genre. As another example, the media application may sort video files chronologically by date stored, thematically by subject matter, or alphabetically by creator, depending upon the user's preference. In some embodiments, the media application may be operative to be synched with a media application of another electronic device (e.g., with iTunes running on a computer).

In some embodiments, communications device 200 may include one or several applications operative to perform communications operations. For example, communications device 200 may include a messaging application, a mail application, a telephone application, a voicemail application, an instant messaging application (e.g., for chatting), a videoconferencing application, a fax application, or any other suitable application for performing any suitable communications operation.

In some embodiments, communications device 200 may include microphone 212. For example, communications device 200 may include microphone 212 to allow the user to transmit audio (e.g., voice audio) during a communications operation or as a means of establishing a communications operation or selecting a media item. Microphone 212 may be incorporated in communications device 200, or may be remotely coupled to communications device 200. For example, microphone 212 may be incorporated in wired headphones, or microphone 212 may be incorporated in a wireless headset. An illustrative wired headset with an in-line microphone may be found in U.S. Provisional Patent Application No. 60/879,155, filed Jan. 6, 2007, which is incorporated herein in its entirety. An illustrative wireless headset that includes a microphone may be found in U.S. Patent Application No. 60/879,177, filed Jan. 6, 2007, which is incorporated herein in its entirety.

Communications device 200 may include any other component suitable for performing a communications operation. For example, communications device 200 may include a power supply, ports or interfaces for coupling to a host device, a secondary input mechanism (e.g., an ON/OFF switch), or any other suitable component.

A user may direct communications device 200 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

Figure 3:
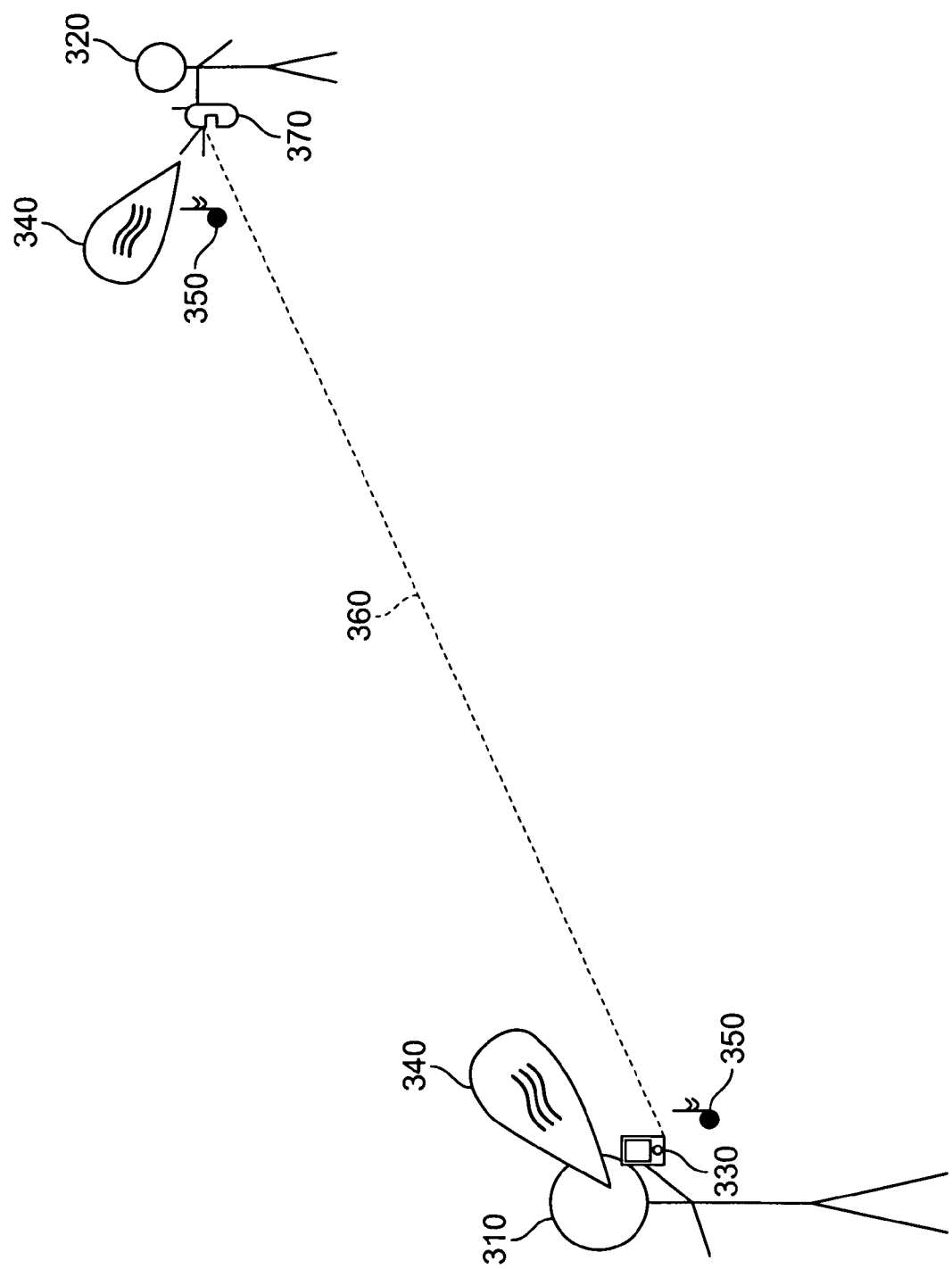
FIG. 3 is a simplified illustration of a communications operation and a media item transmitted over the same communication path in accordance with one embodiment of the present invention.

It may be difficult, however, to initiate a communications operation with a recipient and to share a media item during the communications operation. For example, a user may place a phone call to a friend, and may wish to share a song with the friend. The user may have to terminate the phone call in order to transmit the song to the friend using the same communications device. To avoid such situations, the present invention may allow the user to initiate or accept a communications operation and once the communications operation is established, to transmit a media item over the same communication path to the other participant during the communications operation using the same communications device. FIG. 3 is a simplified illustration of a communications operation and a media item combined over one communication path in accordance with one embodiment of the present invention. User 310 may initiate communications operation 340 using his communications device 330 with recipient 320. Communications device 330 and communications device 370 may include some or all of the features of communications device 200 (FIG. 2), and communications device 370 may or may not be identical to communications device 330. User 310 may initialize communication path 360 between communications device 330 and communications device 370. Once the communication path 360 has been established, user 310 and recipient 370 may perform communications operation 340. Alternatively, recipient 320 may initiate communications path 360 using communications device 370 with user 310.

While communications operation 340 is ongoing over communication path 360, user 310 may choose to share media item 350 with recipient 320. Without terminating communications operation 340, user 310 may use communications device 330 to select any suitable media item 350 for sharing with recipient 320. Such media item may include, for example, a song, a video, a podcast, an image, a voicemail message, or any other suitable media item. Once user 310 has chosen media item 350 to share with recipient 320, user 310 may instruct communications device 330 to incorporate media item 350 into communications operation 340 using any suitable approach. For example, control circuitry 210 (FIG. 2) may receive the user's instruction and may coordinate with playback circuitry 207 and communications circuitry 208 (FIG. 2) to retrieve media item 350 from the memory of communications device 330 and to output media item 350 as if it were part of communications operation 340 over the same communication path 360 to communications device 370.

The user may select a media item to be combined over the same communication path with an established communications operation by selecting one or more options displayed on the screen of a communications device. FIGS. 4-7 are schematic views of illustrative display screens that may be displayed as a user selects and transmits media items during communications operations. The communications device of each of FIGS. 4-7 may be the same or different as, and may include some or all of the features of, communications device 200 (FIG. 2). The user may provide inputs to the communications device using any suitable input mechanism, including for example an interface that includes a touch screen, a "home" button, a click-wheel, combinations thereof, or any other suitable input mechanism.

Figure 4:
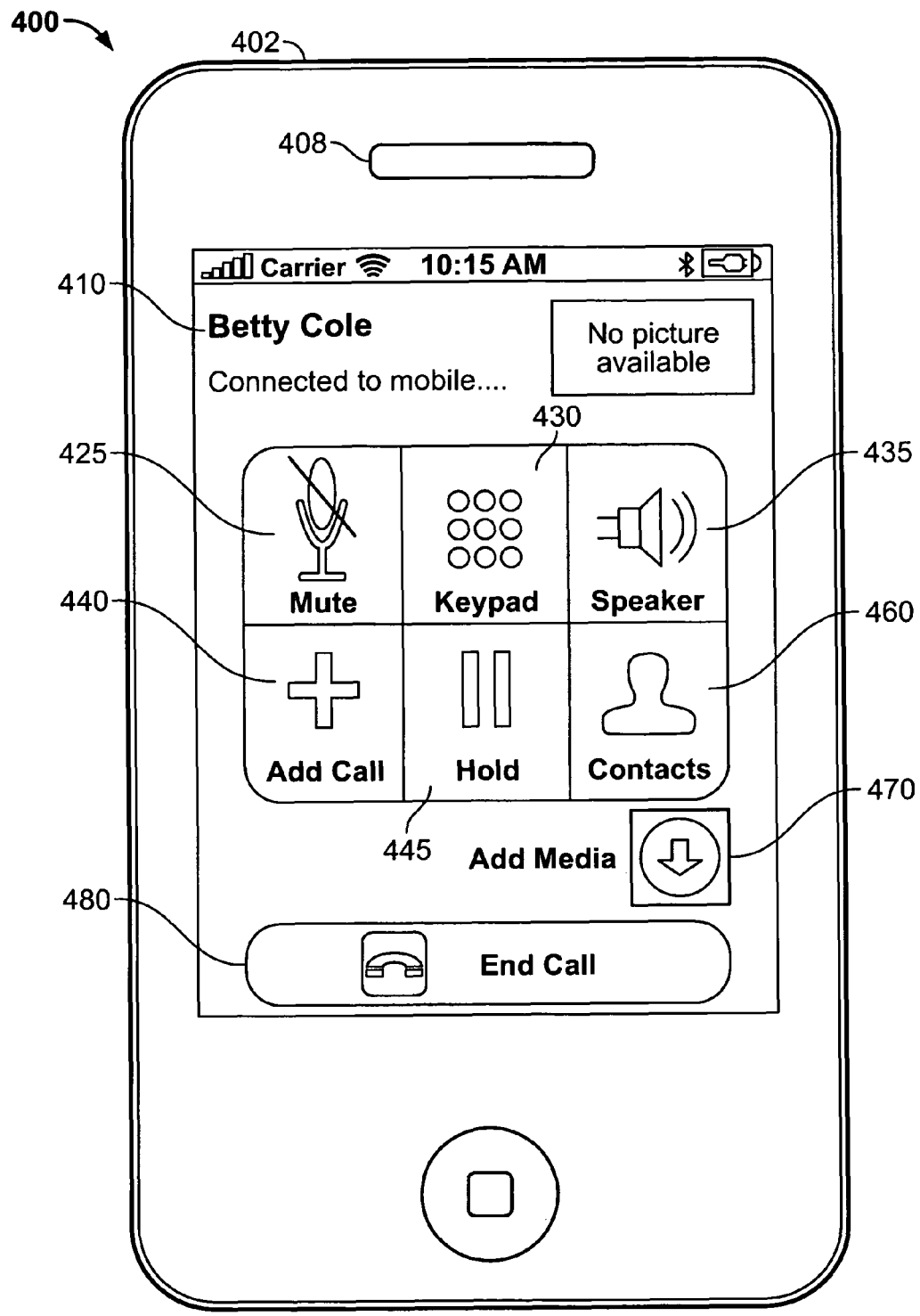
FIG. 4 is a schematic view of an illustrative display screen for viewing selectable communications device options in accordance with one embodiment of the invention.

FIG. 4 is a schematic view of an illustrative display screen for viewing selectable communications device options during an ongoing communications operation in accordance with one embodiment of the invention. Display screen 400 may be displayed in communications device 402 if a communications operation has been established with a recipient. For example, if a user uses communications device 402 to initiate a communications operation with a recipient, such as "Betty Cole," display screen 400 may present recipient information 410 such as the recipient's name, an image of the recipient, an indication of whether the initiated communications operation has been successfully established with the recipient, or any other information useful to the user.

Display screen 400 may include several selectable options for operating different functions of communications device 402 during a communications operation. Displayed icons may include, for example, Mute option 425, Keypad option 430, Speaker option 435, Add Call option 440, Hold option 445, Contacts option 460, Add Media option 470, End Call option 480, or any other suitable option. The user may select Mute option 425 to mute the transmission of audio through the communications operation to the recipient. Keypad option 430 may be selected to display a keypad (e.g., for dialing telephone numbers or for pressing keys in response to prompts) or a keyboard (e.g., for entering an e-mail address). Speaker option 435 may permit the user to hear the voice of the recipient through speaker 408 at an amplified volume without holding communications device 402 to the user's ear. Speaker 408 may be positioned anywhere on communications device 402. For example, speaker 408 may be placed along the bottom edge of communications device 402 underneath a "home" button. Add Call option 440 may be selected to allow the user to add an additional recipient to the communications operation while the current recipient is placed on hold. Hold option 445 may be selected to allow the user to place the current recipient on hold without terminating the communications operation (e.g., while the user writes down a phone number). Contacts option 460 may be selected to recall a list of contacts, stored in or accessible by communications device 402, with whom to perform communications operations. The contacts may be displayed in any suitable manner, including the order in which the contacts were reached through outgoing and incoming communications operations, in alphabetical order, or in an order akin to a speed-dial feature. In some embodiments, communications device 402 may include an Inbox option, which may be selected to display e-mail or text messages received by the user. End Call option 480 may be selected by the user to terminate the current communications operation with the recipient, including terminating the playback of any media item previously selected by the user during the communications operation with the recipient.

Figure 5:
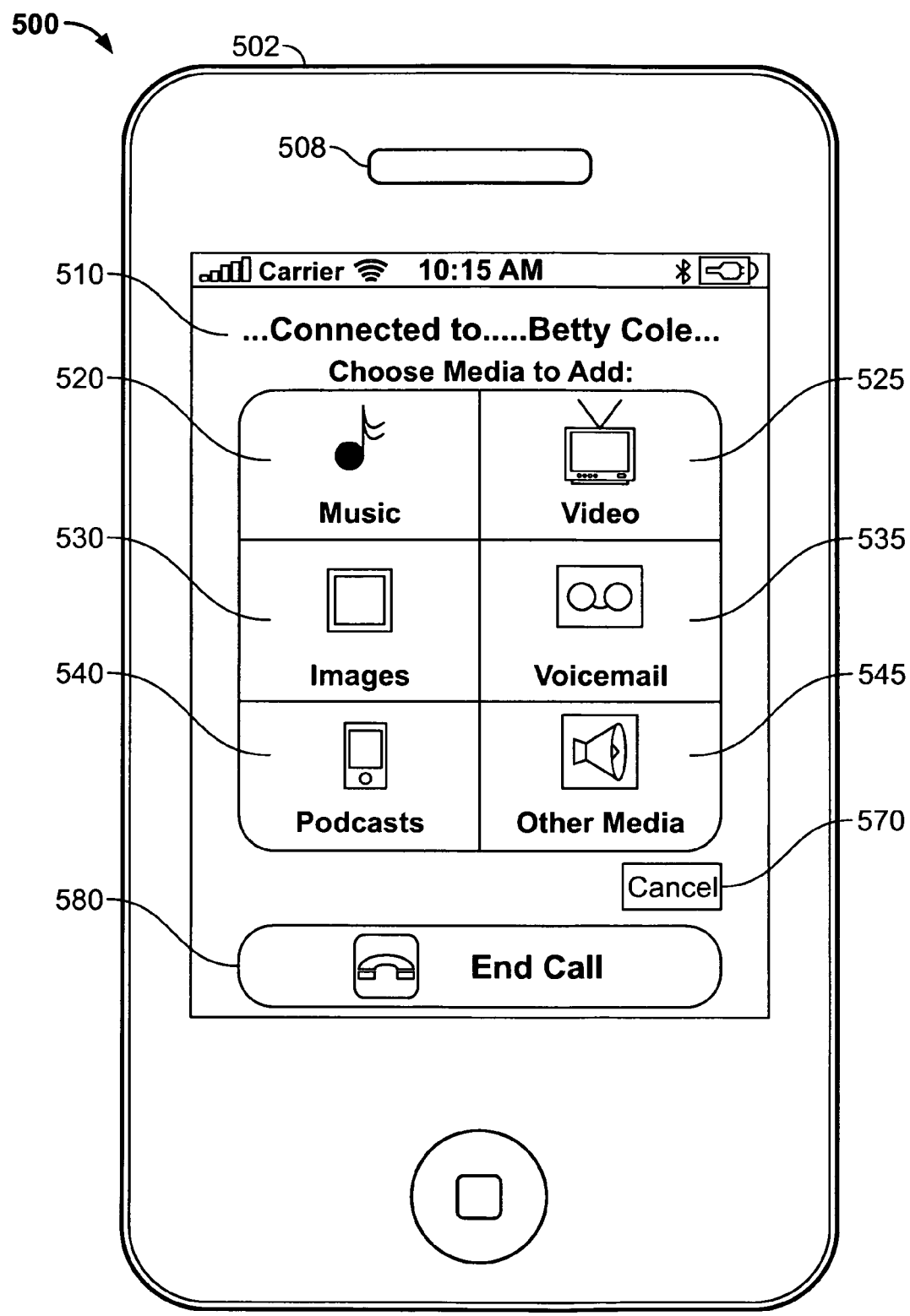
FIG. 5 is a schematic view of an illustrative display screen for viewing selectable media type options in accordance with one embodiment of the invention.

The user may transmit a media item over the same communication path as an existing communications operation by selecting Add Media option 470. In some embodiments, the user may provide any other suitable input to indicate an instruction to select a media item for transmission with an ongoing communications operation over an existing communication path (e.g., a verbal command to communications device 402). In response to receiving a selection of Add Media option 470, communications device 402 may display a series of options for selecting a media item to be transmitted simultaneously with the current communications operation by communications device 402. FIG. 5 is a schematic view of an illustrative display screen for viewing selectable media type options to transmit over an existing communication path in accordance with one embodiment of the invention.

Display screen 500 may be displayed by communications device 502 in response to receiving a user selection of an Add Media option (e.g., Add Media option 470, FIG. 4). Display screen 500 may include several selectable options for selecting a type of media to be played back during an existing communications operation. For example, display screen 500 may include Music option 520, Video option 525, Images option 530, Voicemail option 535, Podcasts option 540, and Other Media option 545. In response to selecting Music option 520, the user may select a musical media item (e.g., a song or a ringtone) to transmit simultaneously with, during, or as part of the communications operation. In response to selecting Video option 525, the user may select a video media item (e.g., a YouTube™ clip or a video recording made using, stored by, or accessible to communications device 502) to transmit simultaneously with the communications operation. In response to selecting Images option 530, the user may select a visual media item (e.g., a screensaver or a picture stored by, accessible to, or captured by a camera within communications device 502) to transmit simultaneously with the communications operation. In response to selecting Voicemail option 535, the user may select a previously received voicemail message stored by communications device 502 to transmit simultaneously with the communications operation. In response to selecting Podcasts option 540, the user may select a podcast (e.g., a podcast downloaded from iTunes and stored within communications device 502) to transmit simultaneously with the communications operation. In response to selecting Other Media option 545, the user may define any other suitable media capable of being transmitted simultaneously with an existing communications operation. In response to selecting Cancel option 570, the user may cancel his selection of a media type and may be returned to a previous display screen without interrupting the communications operation (e.g., display screen 400, FIG. 4).

In some embodiments, the communications device may prevent the selection of one or more media types in display screen 500. For example, a recipient of a communications operation initiated by communications device 502 may be unable to view a video or an image because the type of communications device receiving the communications operation may be unable to process such media types (e.g., the recipient has a cell phone that can not play video or display picture mail), so communications device 502 may prevent the user from selecting Video option 525 or Images option 530. Communications device 502 may determine the capabilities of the receiving device using any suitable approach. For example, communications device 502 may send a request to the recipient's communications device, or may analyze communication path 360 (FIG. 3), to determine whether the recipient's communications device may be capable of processing certain media types (e.g., video). If the recipient's communications device indicates that certain media types may not be processed, or if communication path 360 is unable to transmit certain media types to the recipient, then communications device 502 may cause the corresponding media type options to appear "grayed out" on display screen 500 to indicate to the user which media types may not be selected.

In response to selecting End Call option 580 on display screen 500, the user may terminate an existing communications operation, including terminating the playback of any media item previously selected for transmission by the user during the communications operation.

Figure 6:
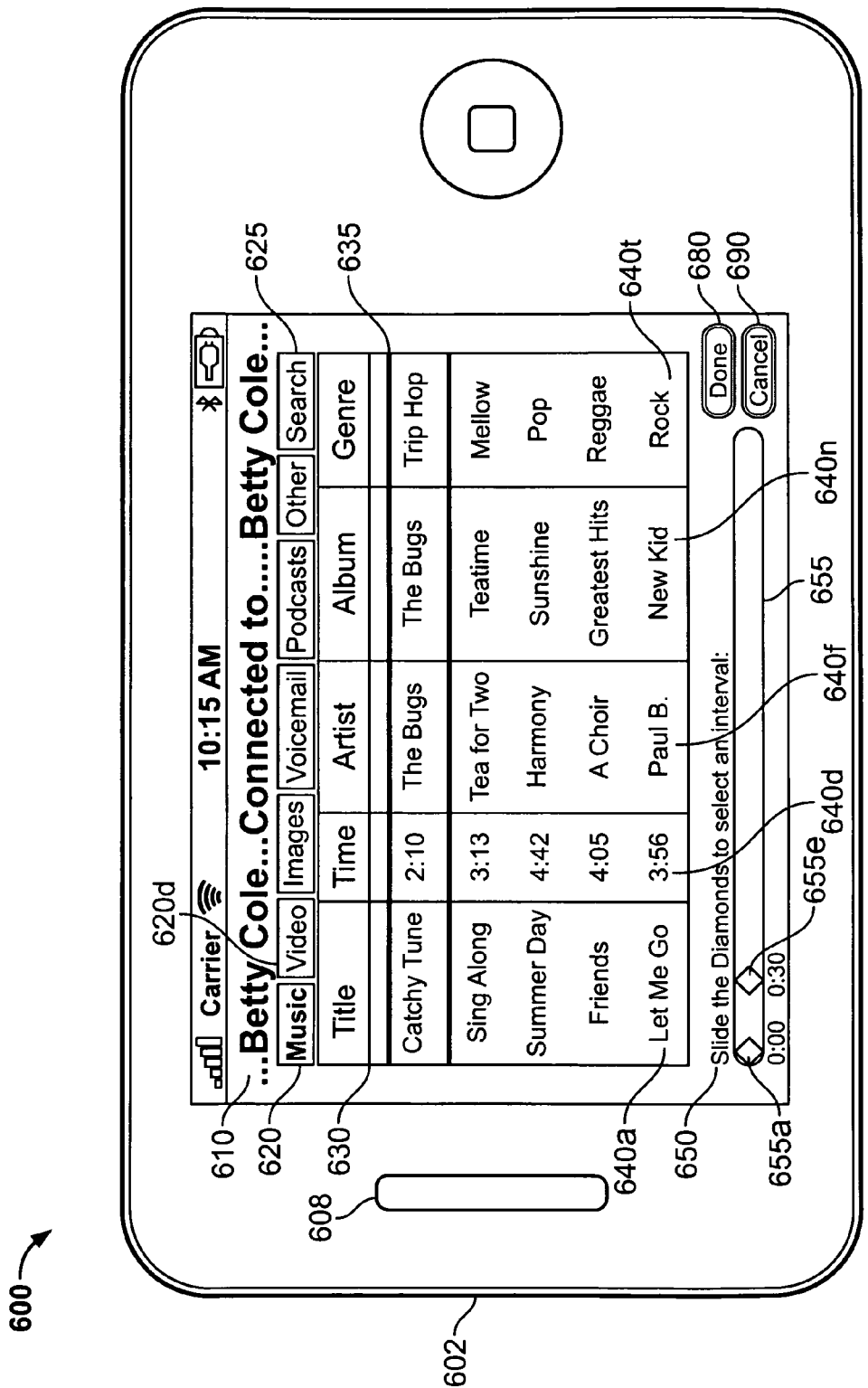
FIG. 6 is a schematic view of a display screen for viewing selectable media item options during a communications operation in accordance with one embodiment of the invention.

The communications device may display any suitable screen or menu for selecting a media item (e.g., a song) to play during the communications operation in response to receiving a user selection of a media type option (e.g., Music option 520, FIG. 5). FIG. 6 is a schematic view of a display screen for selecting a media item during a communications operation in accordance with one embodiment of the invention. Display screen 600 may be displayed by communications device 602 in response to receiving a user selection of Music option 520. Display screen 600 may include several options, including media type option 620, listings 630, and playback interval option 650.

In response to receiving a user selection of a media type in display screen 500 (FIG. 5), the communications device may display media type option 620 such that all possible media types from which the user may choose are listed in display screen 600, but the particular option selected by the user in display screen 500 may be identified (e.g., using a different color or a highlight region) in media type option 620 to indicate its current selection.

In some embodiments, the user may choose to transmit consecutively or simultaneously more than one media item of one or more media types. For example, the user may transmit a video to a recipient during a communications operation and may thereafter or simultaneously transmit a song during the same communications operation, in each instance selecting the media item after first selecting the appropriate media type.

Alternatively, in another embodiment, in response to receiving a selection of Music option 520 (FIG. 5), display screen 600 may not present all possible media types, but may instead present one list within listings 630, comprising all media items stored in communications device 602. All media items may be organized in any manner according to the user's preferences (e.g., grouped by media type).

In yet another embodiment, in response to receiving a selection of a media type option, display screen 600 may present only the media items for the selected media type chosen from display screen 500 (FIG. 5). If the user desires to cancel a selection of a particular media type in favor of a different media type, then the user may select Cancel option 690, and return to display screen 500 to select another media type. A selection of a different media type from display screen 500 may present a new display screen, different from the previously-viewed display screen 600, to present a list of media items corresponding to the newly-selected media type.

To select a media type other than the media type previously selected by the user in display screen 500 (FIG. 5), the user may select an appropriate media type option 620. In response to receiving a different selection of media type option 620 (e.g., the user now selects the "Video" tile 620d), the communications device may now display information related to the chosen media type using any suitable approach. For example, the appearance of listings 630 may change to contain a listing of video-based media, sorted in any manner according to the user's preferences (e.g., sorted alphabetically or sorted by subject matter or sorted by creator).

In response to receiving a selection of Music option 520, listings 630 may present a listing of media items stored in or available to communications device 602 that all share the media type (e.g., music) selected by the user and that are categorized by the user for ease of searching. Listings 630 may include title category 640a, time category 640d, artist category 640f, album category 640n, genre category 640t, and any other category suitable for classifying the stored media items.

The user may select a media item to be played back during a communications operation using any suitable approach. In some embodiments, the user may select several media items to be played back and transmitted simultaneously (e.g., several songs, or a video and a song). The user may select a media item in listings 630 by manipulating highlight region 635. As another example, the user may select listings 630, and may scroll through the media items displayed on display screen 600 until a media item of interest appears in listings 630 for the user to select. Alternatively, the user may select Search option 625 and a keyboard may appear on display screen 600, to allow the user to type in information related to any media item within the selected media type. In response to the user's keyboard input, listings 630 may list all of the media items meeting the criteria specified by the user.

In one embodiment, in response to receiving a selection of Video option 525 or Images option 530 (FIG. 5), the user may be presented with a display screen that contains a thumbnail image for each video or image media item within listings 630. This thumbnail image may allow the user to preview each media item before selecting the desired media item for transmission during the communications operation. If the media item is a video, the user may preview it by selecting the media item. Display screen 600 may play the video within the thumbnail, embedded within listings 630, or display screen 600 may expand the selected video media item to fill all or a portion of display screen 600 (e.g., a split screen between display screen 600 and the selected video media item). The user may stop the preview by using any suitable approach (e.g., selecting an on-screen "stop" or "pause" option).

In response to receiving a selection of a media item to be transmitted with the communications operation, the user may specify the interval of the media item to be played back using any suitable approach. For example, the user may select playback interval option 650 for identifying an interval or a portion of a media item to be played back by communications device 602 for a recipient. In response to receiving the user's selection of playback interval option 650, display screen 600 may present to the user range bar 655, start marker 655a and end marker 655e for specifying the limits of the playback interval. Range bar 655 may represent the full duration of the media item selected by the user in listings 630 and may vary in length between different media items. The user may manipulate start marker 655a and end marker 655b to play only a portion of the selected media item (e.g., by placing start marker 655a at 0:30 into the song, and placing end marker 655e at 1:30 into the song) or to play the entire media item (e.g., by placing start marker 655a at 0:00 into the song, and by moving end marker 655e to the far right end of range bar 655). Alternatively, the user may permit the entire media item to be played back by not selecting playback interval 650, but instead selecting Done option 680 after selecting a media item using listings 630.

Once the user has finished selecting a media item and its particular playback interval, the user may select Done option 680 or provide any other suitable input to signal communications device 602 to play the selected media interval over the same communication path as the communications operation to a recipient. The user may cancel the selection of a media item by selecting Cancel option 690, or by providing any other suitable input.

In response to the user selecting a media item to be transmitted over the same communication path as an ongoing communications operation, the control circuitry within the communications device may direct the playback circuitry to locate the media item within the memory of the communications device and to send all of the data necessary to play the media item properly to the control circuitry for processing. The control circuitry may direct playback circuitry to locate the media item using any suitable approach, such as emitting an electrical signal, containing the user's input, to the playback circuitry.

The control circuitry may package the data representing a media item for transmission to the recipient during a communications operation using any suitable approach. In one embodiment, the control circuitry may include an audio mixer. An audio mixer may be useful in combining together several audio signals from several channels into one output signal. For example, the user may wish to transmit one or more audio media items (e.g., a song, a podcast, or a voicemail) to the recipient of a communications operation, where the ongoing communications operation is in the form of a telephone call. Thus, there may be two or more audio signals to transmit to the recipient, one or more related to the media item and one related to the communications operation. The control circuitry may employ an audio mixer to combine, and possibly also change the level or tone of, the two audio signals into one output signal. The control circuitry may signal the communications circuitry to transmit the output signal to the recipient of the communications operation. The recipient may receive one output signal and may listen to the audio media item and the communications operation simultaneously.

In another embodiment, the control circuitry may include one or more visual data sources for providing video signals to a recipient. If the control circuitry includes two or more visual data sources, each visual data source may provide a unique video signal to the control circuitry for combining into a composite video output. For example, the user may wish to transmit an image to the recipient of a communications operation, where the ongoing communications operation is in the form of a video conference. Thus, there may be two visual data signals to transmit to the recipient, one related to the media item and one related to the communications operation. In order to transmit the two visual data signals over the same communication path, the control circuitry may obtain one unique visual data signal from each visual data source, and may combine the pixels from each signal into one composite output using any suitable approach (e.g., using video processing circuitry). The control circuitry may signal the communications circuitry to transmit the composite output to the recipient of the communications operation. The communications device used by the recipient may include any suitable tool (e.g., video processing circuitry) for receiving the composite output and separating it into the two visual data signals on the recipient's communications device for viewing. The recipient may view the two visual data signals in any suitable manner, including for example, a picture-in-picture approach, or a picture-by-picture or split-screen approach.

In a further embodiment, the control circuitry may include a multiplexer, such as a statistical multiplexer. A multiplexer may be useful in combining together several data streams, such as a video data stream and an audio data stream, into one fixed transport stream for transmission. The control circuitry may employ a multiplexer to combine together any two or more video data streams into one package, also combine together any two or more audio data streams into one package, and combine together any other data streams. Any packages may then be further combined into one fixed stream for transmission by the multiplexer, via the communications circuitry, to the recipient of the communications operation.

For example, the user may wish to transmit a video media item to the recipient of a communications operation, where the ongoing communications operation is in the form of a video conference. Thus, there may be two video data streams to transmit to the recipient, one related to the media item and one related to the communications operation. There may also be two audio data streams to transmit. In order to transmit all of the streams over the same communication path, the control circuitry may employ a multiplexer to combine together any video streams, and to combine together any audio streams. The multiplexer may then combine into one fixed stream the two combined streams. The control circuitry may signal the communications circuitry to transmit the fixed stream to the recipient of the communications operation using any suitable approach.

The communications device used by the recipient may receive the fixed stream as part of the communications operation. The recipient's communications device may further contain a demultiplexer or any other suitable tool to extract the original streams related to the media item and the communications operation, and to present them on the recipient's communications device for viewing and listening. Alternatively, the demultiplexer may interact with the control circuitry to permit the recipient to view the media item while pausing the communications operation, or to view the communications operation while caching the media item in the memory of the recipient's communications device for future playback, or to view and listen to both the media item and the communications operation simultaneously.

Figure 7:
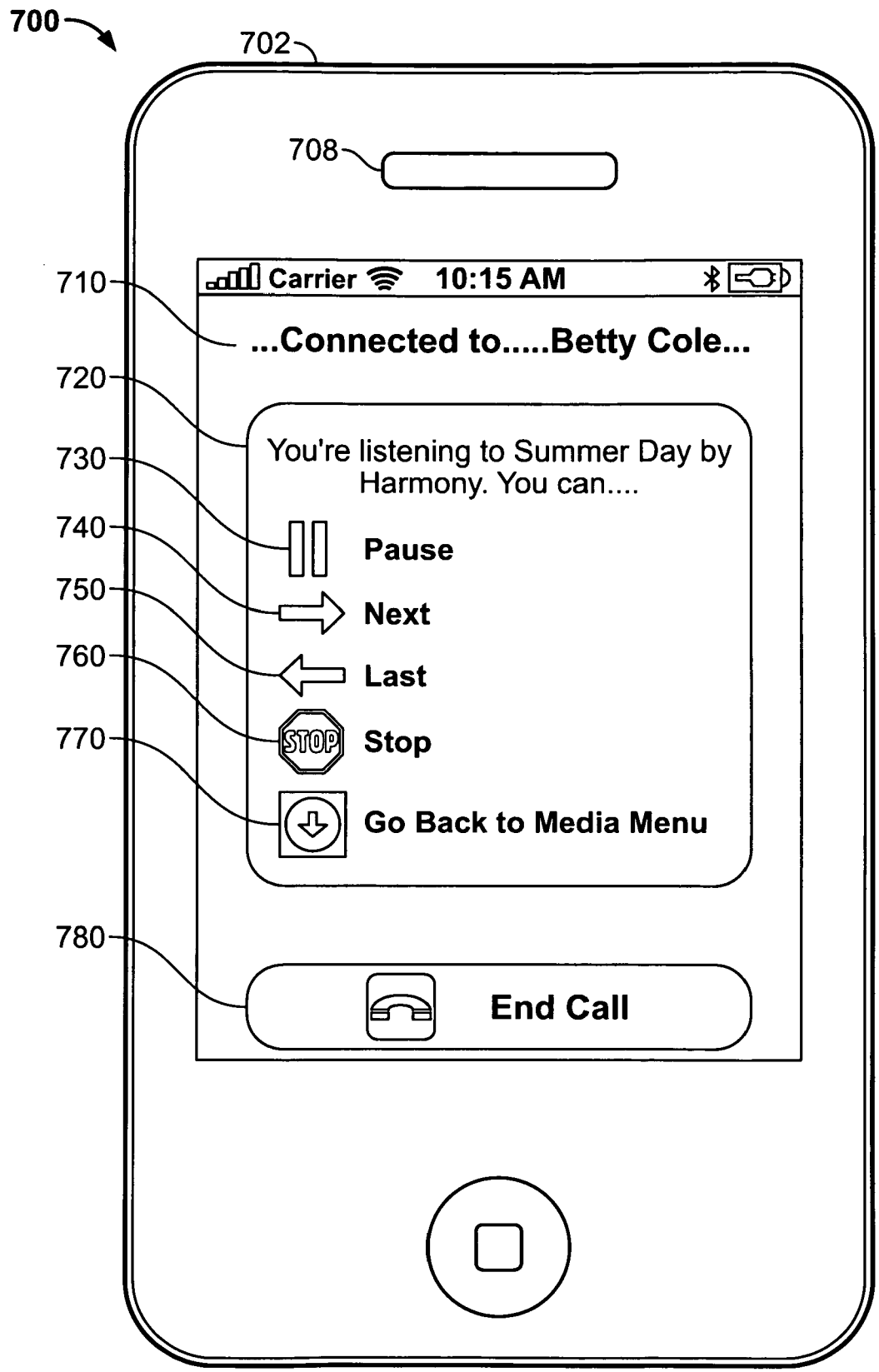
FIG. 7 is a schematic view of an illustrative display screen for controlling the transmission of a media item simultaneously with a communications operation in accordance with one embodiment of the invention.

In response to selecting a media item to be transmitted over the same communication path as an established communications operation, communications device 602 may display a series of options for controlling the playback of a media item or for selecting a different media item. FIG. 7 is a schematic view of an illustrative display screen for controlling the transmission of a media item during a communications operation in accordance with one embodiment of the invention.

Display screen 700 may be displayed in communications device 702 if a media item 720 is being transmitted during an ongoing communications operation over one communication path. The options of display screen 700 may be displayed on either the communications device transmitting the media item, or on the communications device receiving the media item (in which case selecting an option causes an instruction to be sent to the transmitting communications device). Display screen 700 may include several selectable options for controlling the playback of a media item 720 during an established communications operation. For example, display screen 700 may include Pause option 730, Next option 740, Previous option 750, Stop option 760, Go Back option 770, End Call option 780, or any other suitable option. The user may select Pause option 730 to temporarily pause the playback of a selected media item 720. Next option 740 may be selected to stop the transmission of the current media item 720 and to transmit the next media item listed in listings 630 (FIG. 6) for a given media type (e.g., the next song on an album, or the next song in a playlist, or the next song by the same artist). Previous option 750 may be selected to stop the transmission of the current media item 720 and to transmit the previous media item listed in listings 630 (FIG. 6) for a given media type (e.g., the previous song on an album, or the previous song in a playlist, or the previous song by the same artist). Next option 740 and Previous option 750 may appear differently, depending upon the media type chosen for playback by the user. For example, Next Item option and Previous Item option may be expressed in terms of a "song" or an "artist" if a musical media type is chosen by the user, but Next Item option and Previous Item option may be expressed in terms of a "clip" or "footage" or a "creator" if the user chose to playback a video media item. Stop option 760 may be selected to terminate the transmission of the media item 720 while permitting communications device 702 to maintain the established communications operation with a recipient. Go Back option 770 may be selected to allow the user to return to display screen 600 (FIG. 6) or display screen 500 (FIG. 5) to select a different media type or a different media item depending upon the choices available to the user within display screen 600. End Call option 780 may be selected by the user to terminate the current communications operation with a recipient, including terminating any current playback of any media item 720 selected by the user during the communications operation with a recipient.

In one embodiment, a media item comprised of audio (e.g., a song or a voicemail or a podcast) may be heard by the user through speaker 708 or via any other manner in which the user may be listening to the communications operation (e.g., via a headset or via earbuds). Speaker 708 may or may not be the same as speaker 408 (FIG. 4). In another embodiment, a media item consisting of video or other visual data may be displayed on display screen 700 using any suitable approach. For example, the video media item may occupy all of display screen 700 during its transmission to the recipient as part of the communications operation. Alternatively, the video media item may occupy half of the screen in a split-screen approach while options 730 through 780 occupy the other half of display screen 700. A split-screen approach may also be employed by display screen 700 if the user is conducting a video-based communications operation, such as a video conference, with a recipient. In another embodiment, the video media item may appear to occupy all of display screen 700, but the video media item may be an overlay, such that options 730 through 780 may re-appear on display screen 700 if the user selects display screen 700 during playback of the video media item. In a further embodiment, a media item that has both video and audio components may be displayed on display screen 700 and emitted through speaker 708, or any other suitable conduit, simultaneously.

Figure 8:
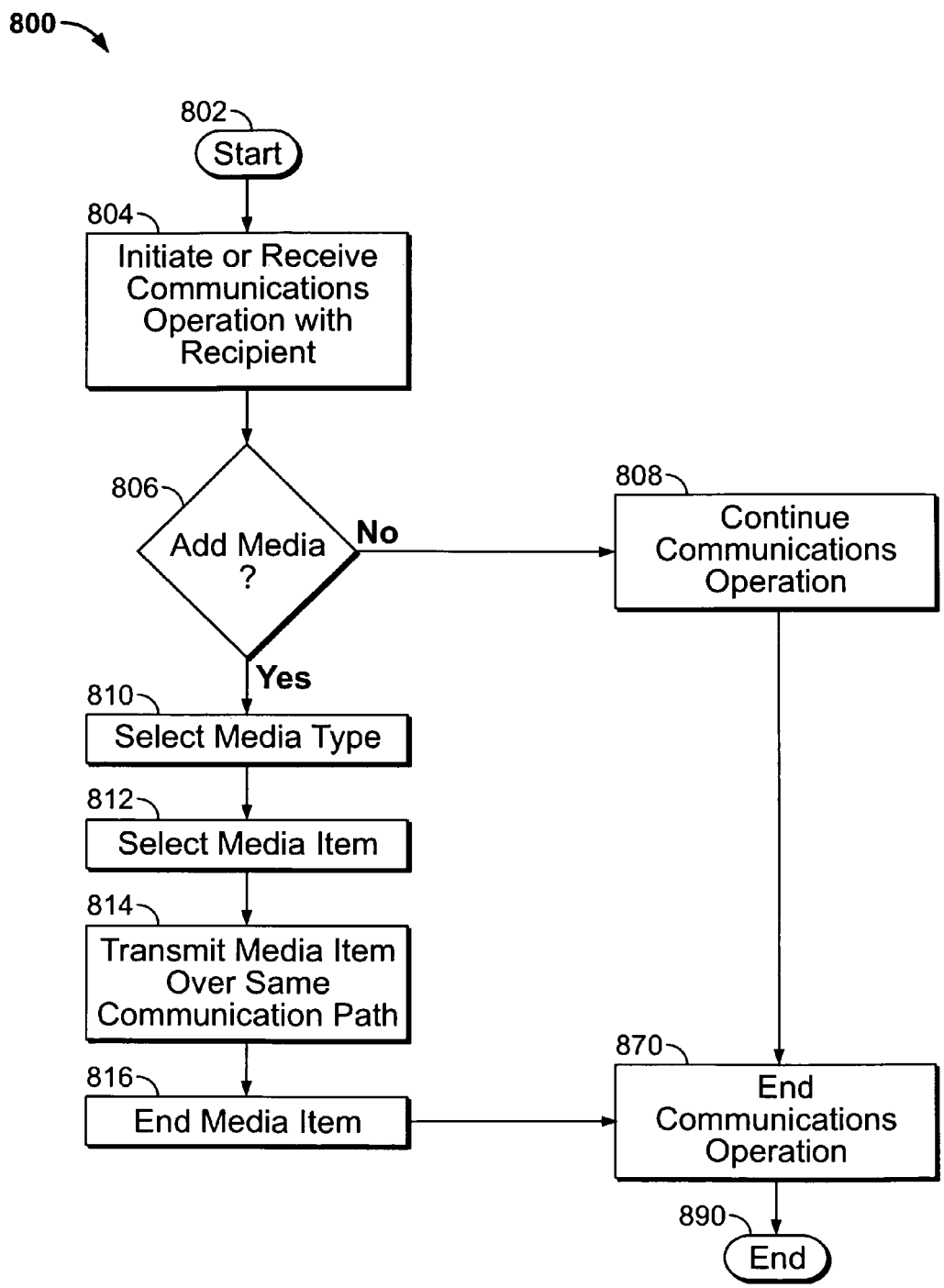
FIG. 8 is a flowchart of an illustrative process for selecting and transmitting a media item during a communications operation in accordance with one embodiment of the invention.

FIG. 8 is a flowchart of an illustrative process for selecting and transmitting a media item during a communications operation in accordance with one embodiment of the invention. Process 800 may begin at step 802. At step 804, the communications device may initiate or receive a communications operation with a recipient. For example, the communications device may place an outgoing call, or may receive an incoming video conference request. At step 806, the communications device may determine whether to add a media item to the transmission of the established communications operation. For example, the communications device may ascertain whether the user has selected Add Media option 470 from display screen 400 (FIG. 4). If the communications device determines not to add a media item to the transmission of the communications operation, then process 800 may advance to step 808 and may continue to maintain the communications operation. From step 808, process 800 may move to step 870, at which the communications operation may end (e.g., in response to a user instruction to end the communications operation). Process 800 may then move to step 890 and end.

If, at step 806, the communications device instead determines that the user has chosen to add a media item to the transmission of the communications operation, process 800 may move to 810. At step 810, the user may select a type of media to transmit. For example, the user may select Music option 520 (FIG. 5). At step 812, the user may select a media item, from the selected type of media, to transmit (e.g., using listings 630, FIG. 6). At step 814, the communications device may transmit the selected media item over the same communication path being used by the communications device to transmit the communications operation. For example, the control circuitry may combine the selected media item with the ongoing communications operation for transmission to the recipient. At step 816, the media item may end (e.g., the interval of the media item specified by the user has run, or the user may cancel or terminate the playback of the media item). Process 800 may then move to step 870, described above.

Figure 9:
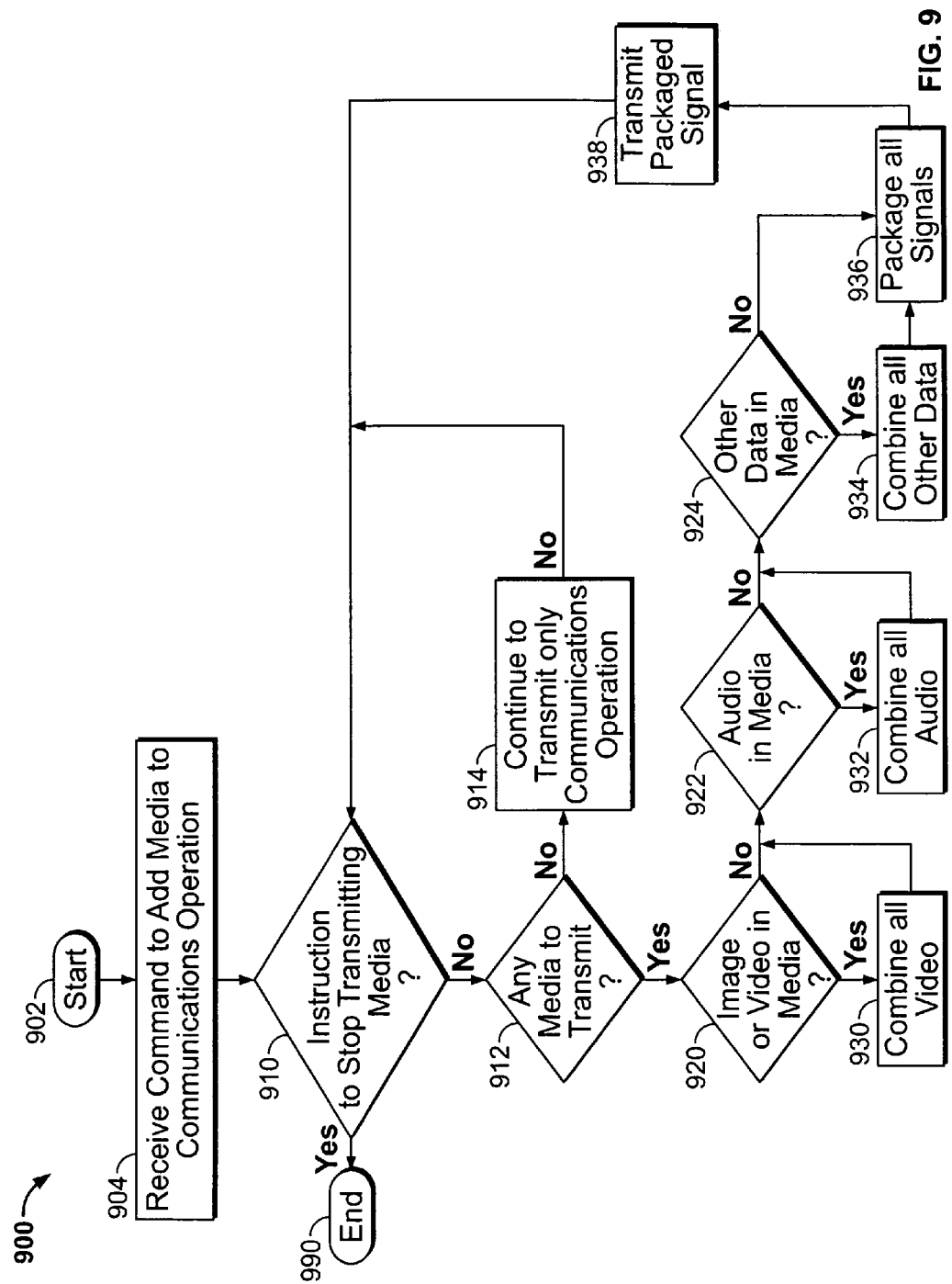
FIG. 9 is a flowchart of an illustrative process for combining a media item with a communications operation in accordance with one embodiment of the invention.

FIG. 9 is a flowchart of an illustrative process for combining a media item with a communications operation in accordance with one embodiment of the invention. In some embodiments, process 900 may take place between steps 810 and 814 of process 800 (FIG. 8). Process 900 may begin at step 902. At step 904, the communications device may receive a command from the user to add a media item to an existing transmission of a communications operation. For example, the user may select Add Media option 470 from display screen 400 (FIG. 4). At step 910, the communications device may determine whether it has received an instruction to stop transmitting a media item. If the communications device has received such an instruction from the user, such as input from the user to terminate the playback of a media item, then process 900 may move to step 990 and end. If the communications device has not received an instruction to stop transmitting a media item along with a communications operation, process 900 may move to step 912.

At step 912, the communications device may ascertain whether any media item has been selected by the user for transmission with a communications operation. For example, the communications device may ascertain whether the user has selected a media type from display screen 500 (e.g., Music option 520, FIG. 5) and whether the user has further selected a media item from listings 630 (e.g., the song Catchy Tune" highlighted by highlight region 635, FIG. 6). If the user has not selected any media item to transmit, then process 900 may move to step 914 and the communications device may continue to transmit only the communications operation currently in progress. Process 900 may then move back to step 910, where the communications device continues to determine whether or not an instruction to stop transmitting media has been received. Process 900 may continue to sample this loop as long as the communications operation is in progress and as long as the user does not specify any media item to transmit simultaneously with the communications operation.

If the communications device determines that the user has selected a media item to be transmitted at step 912, then process 900 may move to step 920. At step 920, the communications device may ascertain whether or not the media item selected by the user contains an image or a video. If the media item does not contain any image or video (e.g., the user has selected a song for transmission), then process 900 may move to step 922. If the media item does contain an image or a video (e.g., the user has selected a YouTube™ clip to share with the recipient of the communications operation) then process 900 may move to step 930. At step 930, the communications device may combine all like video intended for transmission to the recipient of the communications operation. For example, if the user is using the communications device to conduct a video conference with a recipient and the user wishes to send a YouTube™ clip to the recipient simultaneously, then the communications device may combine the two videos for transmission over the same communication path (e.g., using a multiplexer). The communications device may similarly combine the video of a video conference with an image selected by the user. Process 930 may then move to step 922.

At step 922, the communications device may ascertain whether or not the media item selected by the user contains audio. If the media item does not contain any audio (e.g., the user has selected a single picture for transmission), then process 900 may move to step 924. If the media item contains audio (e.g., the user has selected a song to share with the recipient of the communications operation), then process 900 may move to step 932. At step 932, the communications device may combine all audio intended for transmission to the recipient of the communications operation. For example, if the user is using the communications device to conduct a telephone call with a recipient, and the user wishes to send a song to the recipient simultaneously, then the communications device may combine the audio from the telephone conversation and the audio from the song for transmission over the same communication path. The communications device may similarly combine the audio of a telephone call with a voicemail or a podcast chosen by the user to be sent to the recipient simultaneously. Process 930 may then move to step 924.

At step 924, the communications device may ascertain whether or not the media item selected by the user contains any other data. If the media item does not contain any other data, then process 900 may move to step 936. If the media item contains other data, then process 900 may move to step 934. At step 934, the communications device may combine all other data of the same format that may also be intended for transmission to the recipient of the communications operation. Process 930 may then move to step 936.

At step 936, the communications device may package together all of the signals to be transmitted to the recipient into one package. For example, if the user selects a video media item for transmission while conducting a video conference with the recipient, then the communications device may package together video signals from the video clip and the video conference at step 930 and the audio signals from the audio portion of the video clip and the audio portion of the video conference at step 932 for transmission. Process 936 may then move to step 938, where the communications device may transmit the packaged signal to the recipient of the communications operation. Process 900 may then move to step 910, to continue to determine whether the communications device received an instruction to stop transmitting media.

One skilled in the art will appreciate that the invention can be practiced by other than the prescribed embodiments, which are presented for purposes of illustration and not of limitation, and the invention is limited only by the claims which follow.

What is claimed is:

1. A method for transmitting media and communication data of an ongoing communications operation, comprising:
    establishing a communication path between a first communications device and a second communications device using the first communications device, wherein the communication path is established using a communications protocol;
    performing the ongoing communications operation with the second communications device over the established communication path using the first communications device;
    identifying at least one media item using the first communications device;
    combining at least a portion of the identified at least one media item with at least a portion of the communication data of the ongoing communications operation using the first communications device; and
    transmitting with the first communications device the combination of the at least a portion of the identified at least one media item and the at least a portion of the communication data to the second communications device over the established communication path using the communications protocol.

2. The method of claim 1, wherein the identifying the at least one media item comprises receiving a user selection of the at least one media item.

3. The method of claim 1, wherein the identifying the at least one media item further comprises identifying a media type of the at least one media item.

4. The method of claim 3, wherein the identified media type comprises at least one of music, video, image, voicemail, and podcast.

5. The method of claim 1, wherein the identified at least one media item is available for playback by the first communications device.

6. The method of claim 5, wherein the identifying further comprises identifying a playback interval for the identified at least one media item.

7. The method of claim 6, wherein the identified playback interval comprises at least one of a start marker and an end marker for the identified at least one media item.

8. The method of claim 1, wherein the communication is data comprises at least one of data associated with a telephone call, data associated with a video conference call, an email, a voicemail, a text message, a chat, and a fax.

9. The method of claim 1, wherein the combining the at least a portion of the identified at least one media item with the at least a portion of the communication data comprises combining the at least a portion of the identified at least one media item with the at least a portion of the communication data using at least one of a multiplexer, an audio mixer, and video processing circuitry.

10. The method of claim 1, wherein the ongoing communications operation comprises at least one of a telephone call and a video conference call.

11. The method of claim 1, wherein the ongoing communications operation comprises at least one of an audio communications operation and a video communications operation.

12. The method of claim 1, wherein the establishing comprises creating a network using the communications protocol.

13. The method of claim 1 further comprising playing back with the first communications device the at least a portion of the identified at least one media item during the transmitting.

14. The method of claim 1, wherein:
the at least one media item comprises an audio file;
the ongoing communications operation comprises at least one of a telephone call and a video conference call; and
the communications protocol comprises at least one of a telephone protocol, a cellular protocol, a voice over IP ("VOIP") protocol, a Wi-Fi protocol, a local area network ("LAN") protocol, Bluetooth, and an infrared protocol.

15. A method for receiving media and communication data of an ongoing communications operation, comprising:
establishing a communication path between a first communications device and a second communications device using the first communications device, wherein the communication path is established using a communications protocol;
performing the ongoing communications operation with the second communications device over the established communication path using the first communications device; and
receiving with the first communications device a combination of at least a portion of at least one media item and at least a portion of the communication data of the ongoing communications operation from the second communications device over the established communication path using the communications protocol.

16. The method of claim 15, wherein the communication data comprises at least one of data associated with a telephone call, data associated with a video conference call, an email, a voicemail, a text message, a chat, and a fax.

17. The method of claim 15, wherein the at least one media item comprises at least one of music, video, at least one image, at least one voicemail, and at least one podcast.

18. The method of claim 15, wherein the ongoing communications operation comprises at least one of a telephone call and a video conference call.

19. The method of claim 15, wherein the ongoing communications operation comprises at least one of an audio communications operation and a video communications operation.

20. A system for communicating media and communication data of an ongoing communications operation, comprising:
a communications network created using a communications protocol;
a first communications device;
a second communications device; and
a communication path of the communications network established between the first communications device and the second communications device for performing the ongoing communications operation using the communications protocol, wherein:
the first communications device is operative to:
identify at least one media item;
combine at least a portion of the identified at least one media item with at least a portion of the communication data of the ongoing communications operation; and
transmit the combination of the at least a portion of the identified at least one media item and the at least a portion of the communication data of the ongoing communications operation over the established communication path using the communications protocol; and
the second communications device is operative to receive the transmission of the combination of the at least a portion of the identified at least one media item and the at least a portion of the communication data of the ongoing communications operation over the established communication path using the communication protocol.

21. The system of claim 20, wherein the communications network comprises a wireless communications network.

22. The system of claim 20, wherein:
the identified at least one media item is available for playback by the first communications device;
the first communications device is further operative to determine a playback interval for the identified at least one media item; and
the at least a portion of the identified at least one media item corresponds to the determined playback interval.

23. The system of claim 20, wherein:
the identified at least one media item is available for playback by the first communications device; and
the first communications device is operative to control playback of the at least a portion of the identified at least one media item during the transmitting.

24. The system of claim 20, wherein the second communications device is operative to control playback of the received at least a portion of the identified at least one media item.

25. The system of claim 24, wherein the first communications device is further operative to receive a playback control instruction for the identified at least one media item from the second communications device.

26. A communications device for transmitting media and communication data of an ongoing communications operation, the communications device comprising control circuitry and communications circuitry, the control circuitry operative to:
direct the communications circuitry to establish a communication path between the communications device and another communications device using a communications protocol;
perform the ongoing communications operation with the other communications device over the established communication path;
identify at least one media item;
combine at least a portion of the identified at least one media item with at least a portion of the communication data of the ongoing communications operation; and
direct the communications circuitry to transmit the combination of the at least a portion of the identified at least one media item and the at least a portion of the communication data of the ongoing communications operation to the other communications device over the established communication path using the communications protocol.

27. The communications device of claim 26, wherein the control circuitry is operative to identify the at least one media item by receiving a user selection of the at least one media item.

28. The communications device of claim 26, wherein the at least one media item comprises at least one of music, video, at least one image, at least one voicemail, and at least one podcast.

29. The communications device of claim 26, wherein the control circuitry is further operative to identify a playback interval for the identified at least one media item.

30. The communications device of claim 26, wherein the communication data comprises at least one of data associated with a telephone call, data associated with a video conference call, an email, a voicemail, a text message, a chat, and a fax.

31. The communications device of claim 26, wherein the control circuitry is further operative to combine the at least a portion of the identified at least one media item with the at least a portion of the communication data using at least one of a multiplexer, an audio mixer, and video processing circuitry.

32. A communications device for receiving media and communication data of an ongoing communications operation, the communications device comprising control circuitry and communications circuitry, the control circuitry operative to:
  direct the communications circuitry to establish a communication path between the communications device and another communications device using a communications protocol;
  perform the ongoing communications operation with the other communications device over the established communication path; and
  receive a combination of at least a portion of at least one media item and at least a portion of the communication data of the ongoing communications operation from the other communications device over the established communication path using the communications protocol.

33. The communications device of claim 32, wherein the communication data comprises at least one of data associated with a telephone call, data associated with a video conference call, an email, a voicemail, a text message, a chat, and a fax.

34. The communications device of claim 32, wherein the at least one media item comprises at least one of music, video, at least one image, at least one voicemail, and at least one podcast.

35. A method comprising:
  establishing with a first communications device a communication path between the first communications device and a second communications device for communicating communication data, wherein the communication data comprises at least first data of a first type;
  receiving with the first communications device a user selection of a data item for communicating to the second communications device via the established communication path;
  determining with the first communications device whether at least a portion of the selected data item is of the first type; and
  transmitting with the first communications device the first data and the selected data item to the second communications device via the established communication path in a particular manner of a plurality of manners based on a result of the determining.

36. The method of claim 35, wherein the first type comprises at least one of audio and video.

37. The method of claim 35 further comprising, in response to a determination that the at least a portion of the selected data item is of the first type, combining with the first communications device the first data of the first type with the at least a portion of the selected data item into a first package.

38. The method of claim 37, wherein the transmitting in the particular manner comprises transmitting at least the first package to the second communications device.

39. The method of claim 37, wherein:
  the communication data further comprises second data of a second type;
  the method further comprises combining with the first communications device the first package with the second data into a second package; and
  the transmitting in the particular manner comprises transmitting the second package to the second communications device.

40. The method of claim 39, wherein:
  the first type comprises audio; and
  the at least a portion of the selected media item comprises audio; and
  the second type comprises at least one of image and video.

* * * * *

UNITED STATES PATENT AND TRADEMARK OFFICE
CERTIFICATE OF CORRECTION

| | | |
|---|---|---|
| PATENT NO. | : 8,254,828 B2 | Page 1 of 1 |
| APPLICATION NO. | : 11/998648 | |
| DATED | : August 28, 2012 | |
| INVENTOR(S) | : Jeffrey J. Terlizzi | |

It is certified that error appears in the above-identified patent and that said Letters Patent is hereby corrected as shown below:

In the Claims:

At column 16, in claim 8, lines 48-49, please delete "communication is data comprises" and substitute to -- communication data comprises --.

Signed and Sealed this
Nineteenth Day of March, 2013

Teresa Stanek Rea
*Acting Director of the United States Patent and Trademark Office*